United States Patent [19]
Fendt et al.

[11] Patent Number: 6,097,109
[45] Date of Patent: Aug. 1, 2000

[54] PROCESS AND CIRCUIT LAYOUT FOR USING AN INDEPENDENT CAPACITOR FOR THE MOMENTARY RETENTION OF AN OUTPUT VOLTAGE WHEN AN INPUT VOLTAGE IS LOST

[75] Inventors: Günter Fendt, Schrobenhausen; Manfred Herz, Main-Laubenheim, both of Germany

[73] Assignees: Temic Telefunken microelectronic GmbH, Heilbronn; IC-Haus GmbH, Bodenheim, both of Germany

[21] Appl. No.: 09/176,800

[22] Filed: Oct. 22, 1998

[30] Foreign Application Priority Data

Oct. 22, 1997 [DE] Germany ............ 197 46 546

[51] Int. Cl.[7] ............................. H02J 9/00
[52] U.S. Cl. ............... 307/45; 307/44; 307/125; 320/140
[58] Field of Search ............... 307/64, 66, 44, 307/45, 46, 125, 130; 320/140

[56] References Cited

U.S. PATENT DOCUMENTS

| | | | |
|---|---|---|---|
| 3,778,634 | 12/1973 | Hanrihan ........................ | 307/64 |
| 5,247,205 | 9/1993 | Mototani et al. ................ | 307/66 |
| 5,347,164 | 9/1994 | Yeh ................................ | 307/66 |
| 5,585,677 | 12/1996 | Cheon et al. ................... | 307/64 |
| 5,721,481 | 2/1998 | Narita et al. .................... | 320/140 |

FOREIGN PATENT DOCUMENTS

| | | |
|---|---|---|
| 0 183 597 | 6/1986 | European Pat. Off. . |
| 0 562 772 A1 | 9/1993 | European Pat. Off. . |
| 195 42 085 A1 | 7/1996 | Germany . |

*Primary Examiner*—Albert W. Paladini
*Attorney, Agent, or Firm*—Venable; George Spencer; Norman Kunitz

[57] ABSTRACT

Process and circuit layout for using an independent capacitor for the momentary retention of an output voltage when an input voltage is lost. To facilitate a reduction in capacitance in independent circuits of this type at a constant amount of charge, the input voltage is transformed by a DC/DC up converter to a higher capacitor voltage, which is stored in the independent capacitor and the capacitor voltage is transformed by a DC/DC down converter to the output voltage for the load element, which is less than the capacitor voltage. As the DC/DC down converter can utilize capacitor voltages until the output voltage is reached, the residual voltage remaining in the independent capacitor (C) is no longer used. The independent time interval is correspondingly short. According to the invention, the capacitor is disconnected from the output of the DC/DC up-converter and connected to its input when the input voltage is less than a reference voltage. In the situation while the capacitor voltage is connected to the input of the DC/DC up converter, this converter can step-up the capacitor voltage, which drops during the independent time interval, and retain a virtually constant voltage at the output, which the DC/DC down converter then transforms to the output voltage. The independent capacitor can discharge more deeply and the independent time interval can be perceptibly extended. The process and circuit layout are particularly suitable for supplying electronic assemblies in vehicles, as these start from a relatively low input voltage, which is particularly advantageous for the use of DC/DC converters.

5 Claims, 3 Drawing Sheets

State of the art

PROCESS AND CIRCUIT LAYOUT FOR USING AN INDEPENDENT CAPACITOR FOR THE MOMENTARY RETENTION OF AN OUTPUT VOLTAGE WHEN AN INPUT VOLTAGE IS LOST

BACKGROUND OF THE INVENTION

This invention concerns a process and a circuit layout for using an independent capacitor for the momentary retention of an output voltage when an input voltage is lost.

This type of independent capacitor circuitry is already familiar from DE 195 42 085 A1. The interfacing circuitry of DC/DC converters facilitates increased capacitor voltage compared to the input and output voltage which facilitates a reduction in capacitance at a constant amount of charge. A circuit layout of this type is shown in FIG. 2. The input voltage (Ue) is transformed by a DC/DC up converter (1) to a higher capacitor voltage (Uc) which is fed to the independent capacitor (C). The voltage level is stabilised and is largely independent from the input voltage (Ue). Capacitor voltage (Uc) is transformed by a DC/DC down converter (2) to the given level of output voltage (Ua) and fed to the load element (L). The discharge curve of the independent capacitor (Uc) in FIG. 4 clearly shows the disadvantage of this layout, as the independent time interval ($T_{autark}$) only lasts until the output voltage (Ua) is reached. The residual voltage remaining in the independent capacitor (C) cannot be used, as the DC/DC down converter (2) can no longer utilise it.

SUMMARY OF THE INVENTION

The invention provides a process and a circuit layout, which can better exploit the energy stored in the independent capacitor, thus extending the independent time interval.

In the independent situation, while the capacitor voltage is switched or connected to the input of the DC/DC up converter, this converter can step-up the capacitor voltage which drops during the independent time interval and retain a virtually constant voltage at the output, to correspond to the voltage required in the system, which the DC/DC down converter then transforms to the level of the output voltage. At the same time, this stabilization can be used for a momentary independent power supply for additional load elements driven by the intermediate voltage, while they have a voltage tap at the input of the DC/DC down converter. A diode at the input of the DC/DC up converter gives protection against discharge of the independent capacitor in the direction of the input voltage.

The independent time is limited technologically by the extremely low minimum voltage of a DC/DC up converter and the current consumption, which increases accordingly. However, the independent capacitor can continue to discharge and the independent time interval can be perceptibly extended.

DESCRIPTION OF PREFERRED EMBODIMENTS

Figure 1:
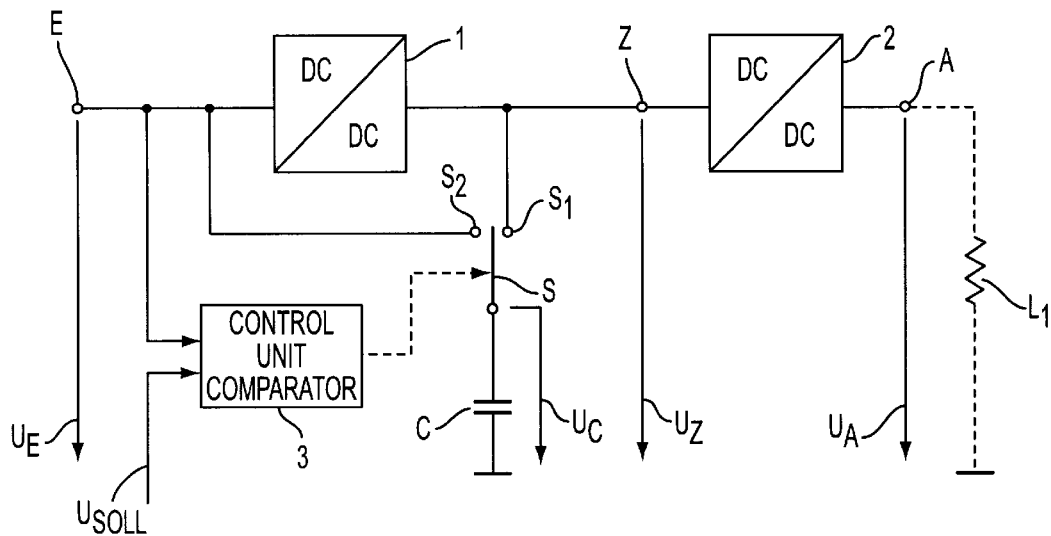
FIG. 1 is a schematic circuit layout according to the invention with a switching element for the independent capacitor.

FIG. 1 shows a circuit layout with a switching element for the independent capacitor to implement the process in accordance with the invention. Input voltage Ue at input E is transformed by DC/DC up converter 1 to a higher intermediate voltage Uz. As is also known from the state of the art, the voltage level is stabilised and is largely independent from the input voltage Ue. In normal operation, intermediate voltage Uz is fed to capacitor C and stored there as capacitor voltage Uc. Switching element S is in switching state S1 for this and connects intermediate point Z with capacitor C. Capacitor voltage Uc is thus identical to intermediate voltage Uz and is transformed by DC/DC down converter 2 to the given level of output voltage Ua and fed to the indicated load element L1. There is also a control unit 3, which detects input voltage Ue and compares it with the given reference value Usoll. Control unit 3 can switch the controllable switching element S between switching states S1, i.e. between Z and C, or to switching state S2, which connects capacitor C to the input of DC/DC up converter 1.

Figure 2:
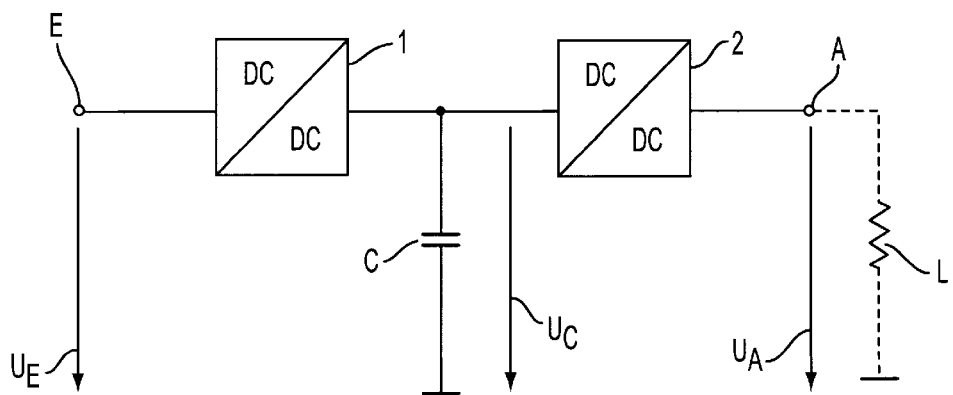
FIG. 2 is a schematic circuit layout in accordance with the state of the art.

FIG. 2 has already been described in the section on the state of the art.

Figure 3:
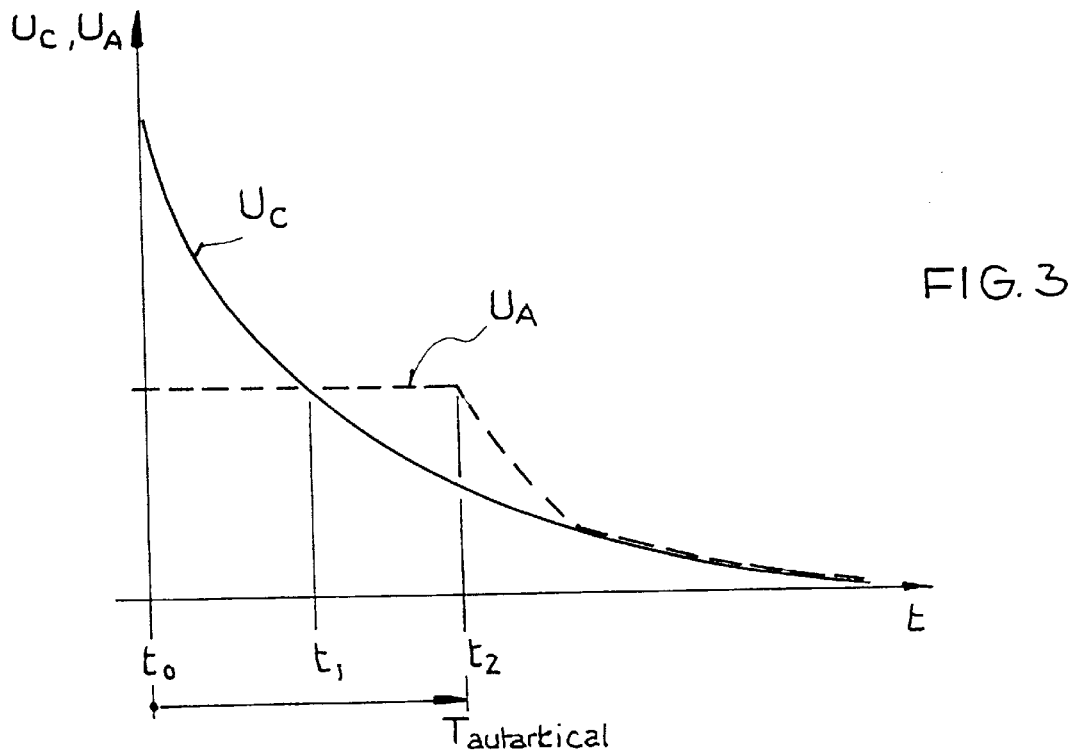
FIG. 3 is a curve of the output voltage in a circuit layout in accordance with FIG. 1.
Figure 4:
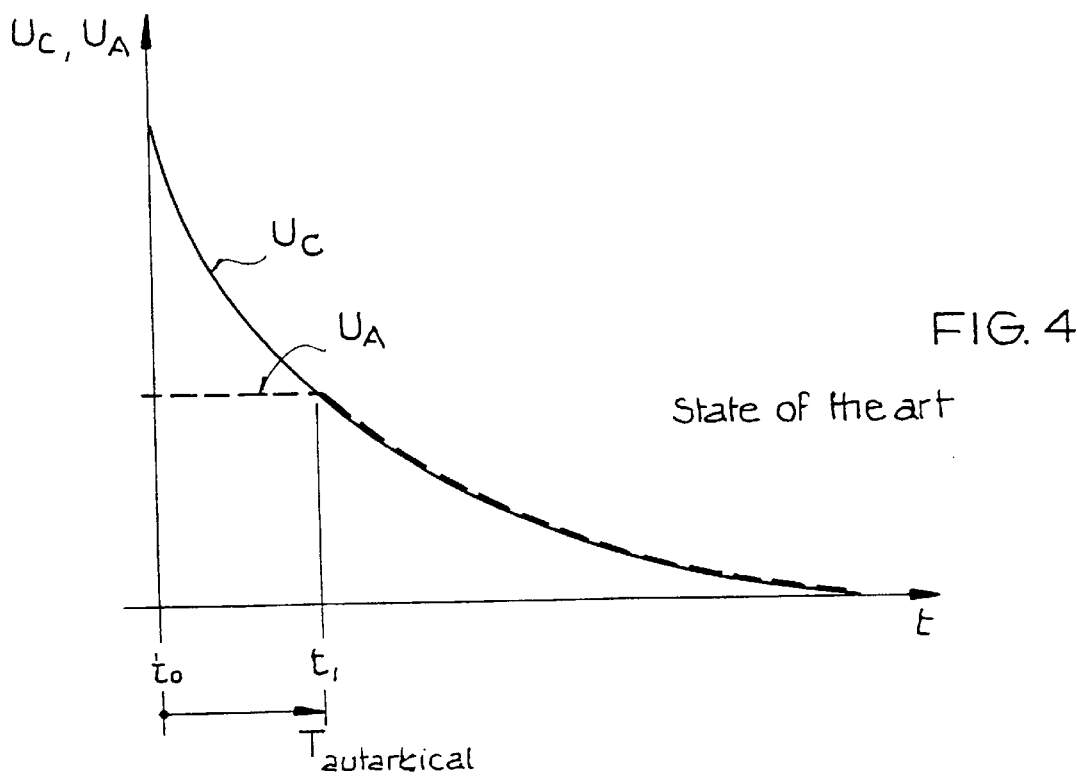
FIG. 4 is a curve of the output voltage in a circuit layout in accordance with FIG. 2 (state of the art).

This process is described and explained using FIG. 3, with the aid of FIG. 1. If at time $t_0$, input voltage Ue drops to less than the reference value Usoll, control unit 3 switches switching element S from switching state S1 to switching state S2, thus switching the connection of the capacitor C from the output of DC/DC up converter 1 to its input. Until time $t_1$, capacitor voltage Uc is higher than the output voltage Ua required at output A, so that this output voltage Ua can obviously be maintained at the requisite level. However, with circuit layouts in accordance with the state of the art, once time $t_1$ is reached, DC/DC down converter 2 can no longer keep output voltage Ua constant and this drops in the same way as capacitor voltage Uc (see FIG. 4). DC/DC up converter 1 can now step up the capacitor voltage Uc which is now switched to the input and thus keep intermediate voltage Uz constant until capacitor C is largely discharged. By retaining a higher intermediate voltage Uz, the DC/DC down converter can retain output voltage Ua perceptibly longer. Independent time $T_{autark}$ is thus extended up to time $t_2$.

Should input voltage Ue once again exceed the given reference value $U_{soll}$, control unit 3 will reset switching mechanism S back to switching state S1 and charge capacitor C with the intermediate voltage Uz generated by DC/DC up converter 1.

Figure 5:
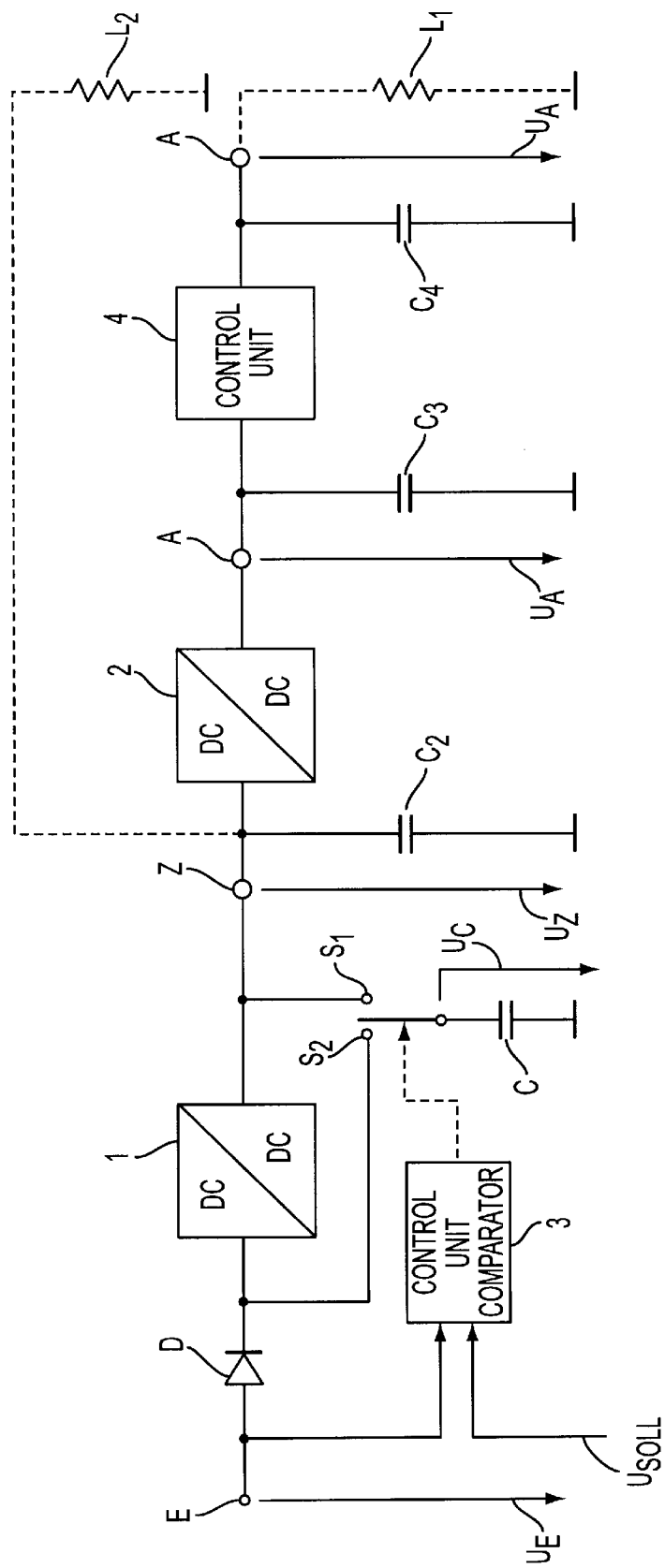
FIG. 5 shows a further development of the circuit layout according to the invention with a diode located at the input end.

FIG. 5 shows a further development of the example shown in FIG. 1, wherein a diode D is placed between input E and the input of DC/DC up converter 1, so that current cannot discharge from independent capacitor C in the direction of input voltage Ue, if independent capacitor C is switched to the input of DC/DC up converter 1. In addition to this, a further capacitor C2 is placed at intermediate point Z, parallel to output A, to act as a stabilising capacitor for intermediate voltage Uz. At output A, before the actual load element L1, a third capacitor C3 is placed parallel to the load element, which also has a stabilising function over output voltage Ua, which is first fed to a controllable unit 4. The output voltage generated by this unit is fed to a fourth capacitor C4, parallel to load element L1.

In addition to this, a further load element, L2, is indicated in FIG. 5, which taps intermediate voltage Uz at intermediate point Z as its own, stabilised, operating voltage, thus also falling under momentary independent protection. The independent time is approximately the same as that indicated in FIG. 3, as Uz is derived from Uc using DC/DC up converter 1. The organisation in the circuit of the individual assemblies requires specialist knowledge and there are numerous possible variants, including using commercially available assemblies.

What is claimed is:

1. Process for the monetary retention of a desired output voltage (Ua) for a load element (L1) when an input voltage (Ue) is lost, using an independent capacitor (C), connected in parallel to the load element (L1), said process comprising the steps of:

transforming the input voltage (Ue) by a DC/DC up converter (1) to a voltage (Uz), higher than the desired output voltage; storing the voltage Uz in the independent capacitor (C) connected to the output of the DC/DC up converter 2 as a capacitor voltage Uc; transforming the capacitor voltage (Uc) by a DC/DC down converter (2) to the desired output voltage (Ua) for the load element (L1), which output voltage is less than the capacitor voltage (Uc); and comparing the input voltage (Ue) with a given reference value (Usoll); and when the input voltage (Ue) drops below the reference value (Usoll), switching the independent capacitor (C) from the output of the DC/DC up converter (1) to the input of the DC/DC up converter.

2. Circuit layout for the momentary retention of a desired output voltage (Ua) for a load element (L1) when an input voltage (Ue) is lost, using an independent capacitor (C), connected in parallel to the load element (L1), said circuit layout comprising:

a DC/DC up-converter, having an input connected to receive the input voltage, for transforming the input voltage Ue to a voltage higher than the desired output voltage (Ua); an independent capacitor (C) connected to the output of the DC/DC up-converter for storing the output voltage of the up-converter; a DC/DC down converter for transforming the capacitor voltage (Uc) to the output voltage (Ua) for the load element (L1), which output voltage Ua is less than the capacitor voltage (Uc); and, a control unit (3), which compares the input voltage (Ue) to a given reference value (Usoll) and, when the input voltage (Ue) drops below the reference value (Usoll), activates a controllable switching element (S) which disconnects the independent capacitor (C) from the output of the DC/DC up converter (1) and connects the capacitor to the input of the DC/DC up-converter.

3. Circuit layout in accordance with claim 2, wherein a diode (D) is provided between the input of the DC/DC up converter (1) and the input voltage (Ue), directed such that no current can discharge from the independent capacitor (C) when connected to the input of the DC/DC up converter (1) in the direction of the input voltage (Ue).

4. Circuit layout in accordance with claim 2, wherein a voltage tap for an additional load element (L2) is provided at the input of the DC/DC down converter (2), which is supplied with a stabilising and independently protected intermediate voltage (Uz).

5. Circuit layout in accordance with claim 3, wherein a voltage tap for an additional load element (L8) is provided at the input of the DC/DC down converter (2), which is supplied with a stabilising and independently protected intermediate voltage.

* * * * *